United States Patent [19]

Vaida et al.

[11] Patent Number: 4,667,602
[45] Date of Patent: May 26, 1987

[54] ESCAPEMENT MECHANISM

[75] Inventors: Robert Vaida, Ellington, Conn.; Harold Osthus, Seattle, Wash.

[73] Assignee: Gerber Garment Technology, Inc., South Windsor, Conn.

[21] Appl. No.: 738,162

[22] Filed: May 24, 1985

[51] Int. Cl.⁴ .............................................. B61K 7/16
[52] U.S. Cl. .................................. 104/253; 104/249; 198/463.6; 221/301
[58] Field of Search ............... 104/249, 250, 252, 253; 198/463.6, 465.4; 221/289, 299, 301

[56] References Cited

U.S. PATENT DOCUMENTS

| 1,126,562 | 1/1915 | Pero | 104/253 |
|---|---|---|---|
| 2,679,810 | 6/1954 | Schutt | 104/253 X |
| 3,020,854 | 2/1962 | Klamp | 104/249 |
| 3,055,311 | 9/1962 | Sgriccia et al. | 104/250 X |
| 3,099,226 | 7/1963 | Kokoras | 104/250 X |
| 3,347,171 | 10/1967 | Torrance | 104/250 X |
| 3,868,907 | 3/1975 | Schippers | 104/173 ST |

FOREIGN PATENT DOCUMENTS

| 27846 | 3/1907 | Austria | 221/299 |
|---|---|---|---|
| 209335 | 4/1909 | Fed. Rep. of Germany | 221/301 |

Primary Examiner—Randolph A. Reese
Attorney, Agent, or Firm—McCormick, Paulding & Huber

[57] ABSTRACT

An escapement mechanism for advancing a leading one of a row of gravity biased objects supported on a guide comprises a leading stop bracket and a trailing stop bracket pivotally mounted in fixed relation to one another and a piston and cylinder assembly, which pivots the two brackets. The brackets are angularly displaced relative to one another such that at one time, one stop bracket is in the path of the objects to back them up and the other stop is out of the path of said objects. The objects back up against the leading stop bracket and then the piston and cylinder assembly simultaneously pivots the trailing stop bracket into the path of the object immediately behind the leading object and pivots the leading stop bracket out of the path of the leading object to allow the leading object to advance by gravity beyond the escapement mechanism. At a later time, the piston and cylinder assembly simultaneously pivots the leading stop bracket back into the path of the remaining objects and swings the trailing stop bracket out of the path of the remaining objects so that the remaining objects back up against the leading stop bracket.

4 Claims, 7 Drawing Figures

ESCAPEMENT MECHANISM

BACKGROUND OF THE INVENTION

The invention relates generally to escapement mechanisms and deals more particularly with an escapement mechanism which is very reliable and operable with a single actuator.

Escapement mechanisms of the type with which this invention is concerned are commonly used to advance or index a leading one of a row of gravity biased objects such as food items or mechanical parts supported on a guide. They are also used to controllably advance workpiece carrying trolleys in conveyorized transport systems such as the one disclosed in co-pending U.S. patent application, Ser. No. 683,379, filed 12-19-84 by Osthus and Nymark, assigned to the assignee of the present invention and hereby incorporated by reference as part of the present disclosure.

The aforesaid conveyorized transport system is highly automated and includes a rail network for carrying the trolleys, a propulsion track for propelling the trolleys, and switches for routing the trolleys within the rail network. The rail network comprises a main rail and subsidiary loop rails, the main rail guides the trolleys to and from the subsidiary loop rails, and the subsidiary loop rails guide then to and from work stations. The propulsion track is located adjacent the main rail and includes an endless moving chain and pushers attached thereto, which pushers engage the trolleys to propel them along the main rail. The switches are computer controlled and are located between the main rail and the subsidiary loop rails to transfer the trolleys to and from the subsidiary loops as indicated by a computer program tape.

Each subsidiary loop rail slopes continuously downwardly from where the trolleys are taken from the main rail, and eventually joins with an elevator which reloads the trolleys onto the main rail so that the trolleys move along the subsidiary loop rail by gravity. A trolley stop is located approximately midway around the subsidiary loop rail adjacent the work station, which trolley stop comprises an escapement mechanism at its upstream end and a gate at its downstream end. The escapement mechanism backs up the trolleys on the subsidiary loop rail to await attention by an operator, and when activated, it releases a leading one of the trolleys which then rolls by gravity to the gate where it is isolated form the other trolleys and the workpieces it carries are freely accessible to the operator. The operator then may perform a work operation on the accessible workpieces, and when completed, activate the gate to release the trolley to roll by gravity towards the elevator and activate the escapement mechanism to release another trolley carrying fresh workpieces to the gate. Another escapement mechanism is located at the base of the elevator to release the trolleys one by one for loading onto it.

Both escapement mechanisms of the aforesaid patent application comprise a leading piston and cylinder assembly and a trailing piston and cylinder assembly mounted parallel to one another, adjacent the subsidiary loop rail such that the piston rods of the assemblies are extendable to cross the subsidiary loop rail into the path of the trolleys. The piston rods are spaced from each other by a few inches corresponding to the linear displacement of each trolley, and in the rest condition, the leading piston rod is extended to back up the trolleys and the trailing piston rod is retracted. Then, when the escapement mechanism is activated, the trailing piston rod is extended between the trolley presently first in line and the one behind it and the leading piston rod is retracted to allow the leading trolley to roll by gravity towards the downstream gate and to allow the remaining trolleys to advance slightly to the trailing piston rod. After the leading trolley advances past the leading piston rod, the leading piston rod is extended and the trailing piston rod is retracted to allow the remaining trolleys to advance to the leading piston rod. It is usually required that the leading piston rod be retracted shortly after the trailing piston rod is extended; otherwise all the trolleys may advance slightly during a short period when the ends of both piston rods pass each other and are out of the path of the trolleys and the trolley second in line moves into the path of the trailing piston rod jamming it.

There are at least two ways to control the timing of the extension and retraction of the piston rods of the piston and cylinder assemblies within the aforesaid escapement mechanism. Two solenoids may be used to independently control the assemblies but this complicates the control system, or both assemblies may be connected in parallel and a single solenoid used for both assemblies, provided a suitable delaying mechanism, such as a flow valve, is installed between the solenoid and the leading piston and cylinder assembly. By appropriate energization of the solenoid, the trailing piston rod is first extended between the leading trolley and the next in line, but because of the delaying mechanism, the leading piston rod is not fully retracted until a short time later. The flow valve plays little role in the deactivation of the piston and cylinder assemblies because of internal bias springs, and after the leading trolley advances past the leading piston rod, both piston and cylinder assemblies are de-activated so both piston rods return to their rest position approximately simultaneously. The flow valve within the escapement mechanism is difficult to adjust to provide the necessary delay between the extension of the trailing piston and the retraction of the leading piston and requires periodic maintenance.

The gate comprises another piston and cylinder assembly having a piston rod which is extendable to cross the subsidiary loop rail in the path of the released trolley. The solenoid which activates the escapement mechanism of the stop can also be used to control the piston and cylinder assembly of the gate in synchronism with the leading piston and cylinder assembly of the escapement mechanism provided that the time between the retraction of the leading piston rod and its re-extension is less than the time it takes for the trolley to roll from the escapement mechanism to the gate so that the trolley does not bypass the gate.

In addition to the difficulty in adjusting the flow valve, there is another problem with the aforesaid escapement mechanism. When a number of trolleys are backed up against either piston rod, the weight of the trolleys exerts a sizable bending moment on the rod, which moment may jam the piston and cylinder assembly.

Accordingly, a general aim of the invention is to provide a very reliable escapement mechanism.

A more specific aim of the invention is to provide an escapement mechanism which is operable with a single actuator, simple to operate and rarely in need of adjustment.

SUMMARY OF THE INVENTION

The invention resides in an escapement mechanism used to controllably advance a leading one or ones of a row of gravity-biased objects supported on a guide. The escapement mechanism comprises a leading stop movably mounted adjacent a portion of the guide, which leading stop rests at a position in the path of the objects and backs them up, and a trailing stop movably mounted adjacent said portion of the guide somewhat upstream of the leading stop, which trailing stop rests in a position out of the path of the objects. According to one feature of the invention, the escapement mechanism further comprises an actuator means which simultaneously swings the leading stop out of the path of the objects and swings the trailing stop into the path of other of the objects behind the leading object to release the leading object and block the path of other of the objects and then pauses while the leading object advances past the leading stop. Next, the actuator simultaneously swings the leading stop into the path of the objects and swings the trailing stop out of the path of the objects to back up the remaining objects against the leading stop until it is desired to advance another one or ones of the remaining objects.

DETAILED DESCRIPTION OF THE PREFERRED EMBODIMENT

Figure 1:
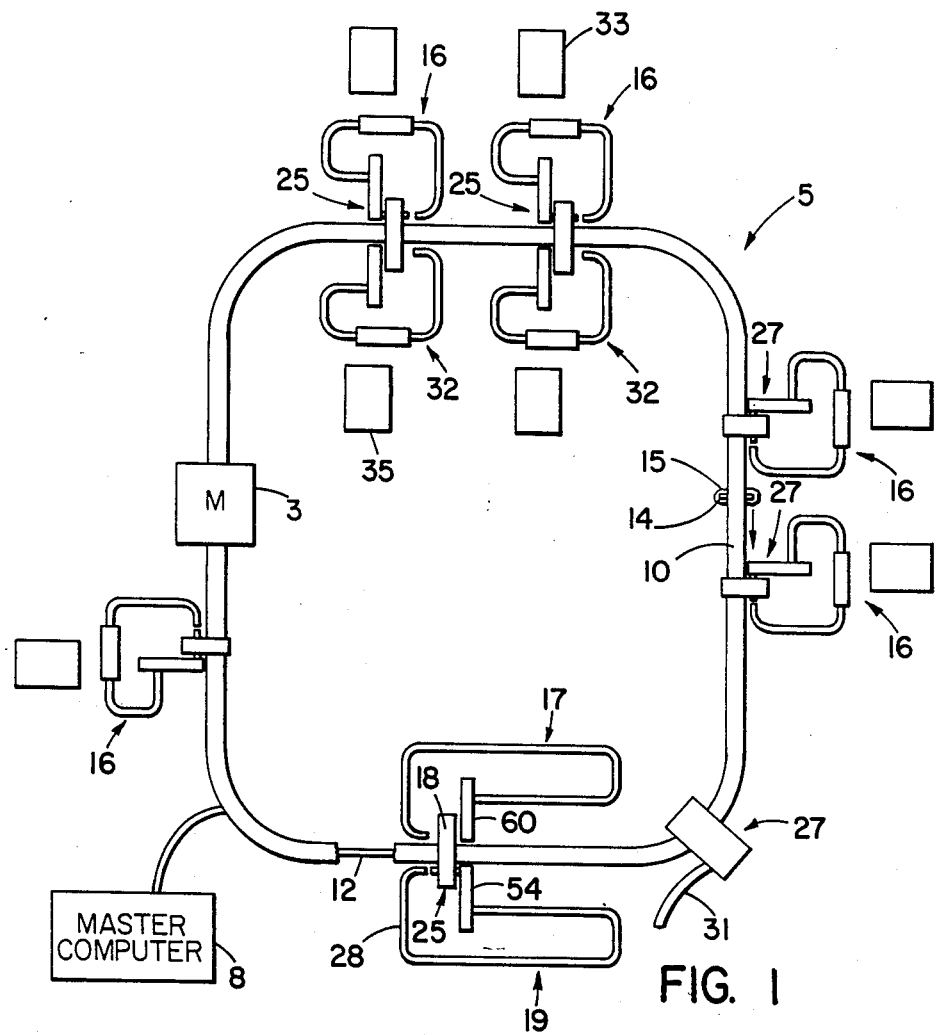
FIG. 1 is a top view of a conveyorized transport system in which the invention is utilized.

Turning now to the drawings, FIG. 1 illustrates a conveyorized transport system generally designated 5 in which the invention is embodied. The system includes a master computer 8, a propulsion track 10 having pushers 15,15 extending downwardly therefrom, a motorized drive unit 3 for driving the propulsion track 10, a main rail 12 situated beneath the propulsion track 10, trolleys 14,14 frictionlessly riding on the rail 12 and propelled by the pushers 15,15, and subsidiary loops 16,16, 17, 19 and 32,32 located along the main rail some of which are paired. Each of the subsidiary loops 16,16 and 32,32 leads to and from a work station 33, 35 respectively and the conveyorized transport system further includes three-position switches 25,25 for routing the trolleys between the main rail and each pair of subsidiary loops and two-position switches 27,27 for routing the trolleys between the main rail and each unpaired subsidiary loop or a division rail 31.

Figure 2:
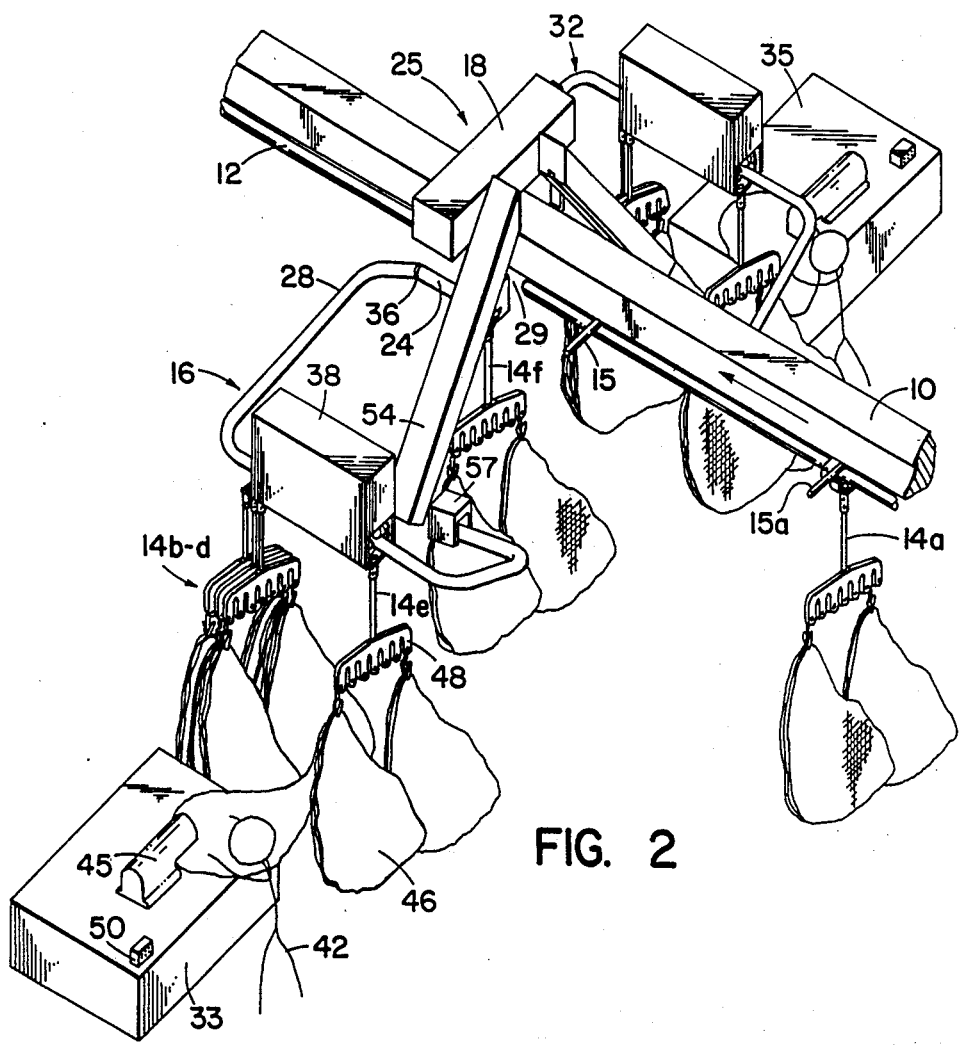
FIG. 2 is a perspective view of a section of the conveyorized transport system of FIG. 1.

FIG. 2 illustrates a section of the computer controlled, conveyorized transport system of FIG. 1, and shows the main rail 12, the propulsion track 10 situated above the main rail and a pair of subsidiary loops 16 and 32. One of the trolleys 14, indicated as a, rides on the main rail 12 and is propelled by one of the pushers 15 indicated as a. The pusher 15a itself is driven by an endless, moving chain located within the overhead propulsion track 10, and in FIG. 2, the pusher is shown moving trolley 14a towards the subsidiary loop 16. The subsidiary loop 16 includes a looping rail 28, a stop 38, and an elevator 54, and the oppositely disposed subsidiary loop 32 is a mirror image. The main rail 12 and the looping rail 28 preferably are made of piping.

The switch 25 includes a straight section 24 of rail and an actuator 18, and to transfer a trolley from the main rail 12 to the looping rail 28, the rail section 24 first receives the trolley from the main rail by the efforts of the pusher 15 and then the actuator 18 transfers the rail section 24 from its present position, bridging a gap 29 in the main rail 12 to a position (as shown), bridging a gap in the subsidiary loop 16. Then the pusher 15 pushes the trolley onto the looping rail 28.

The looping rail 28 slopes downwardly from its entrance 36 where trolleys are received from the main rail via the switch 25 and immediately angles away from the main rail 12 out of the reach of the pushers 15,15 so that soon after a trolley enters the loop it rolls along it by gravity until it reaches the stop 38 located approximately midway around the looping rail. The stop 38 includes an escapement mechanism 61 (FIG. 3) at its upstream end and an escapement mechanism 63 (FIG. 3) which serves as a fail-safe gate at its downstream end. The stop is shown backing up trolleys 14b to 14d at its upper gate, trolley 14b being first in line. There the trolleys 14b to 14d wait until an operator 42 finishes a work operation such as sewing with sewing machine 45 on workpieces 46,46 carried by the trolley 14 indicated as e and is ready for the workpieces carried by the trolley 14b. Then, the operator presses a momentary switch on control box 50 to simultaneously activate the escapement mechanism 63 to release the trolley 14e to roll towards the elevator and the escapement mechanism 61 to release the trolley 14b to roll to the escapement mechanism 63. After reaching the escapement mechanism 63, the trolley 14b is isolated from the rest of the trolleys, thereby providing the operator with free access to the workpieces carried by it.

At the base of elevator 54 is another engagement mechanism 57 which backs up trolleys released by the escapement mechanism 63 while they wait their turn to enter the elevator, one by one, and be reloaded onto the main rail 12. When the master computer senses an absence of trolleys on the switch 25 and on the main rail 12 just upstream of the switch 25, the computer directs the escapement mechanism 57 to release one trolley to an elevator car, which car comprises a slotted track section. Next the computer directs the elevator 54 to elevate the car with the trolley as it did previously to the trolley 14b and directs the actuator 18 of the switch to move the rail section to the gap in the subsidiary loop 16. After the trolley reaches the top of the elevator 54, it is engaged by the next arriving pusher, and the switch 25 directs it back onto the main rail 12.

Figure 3:
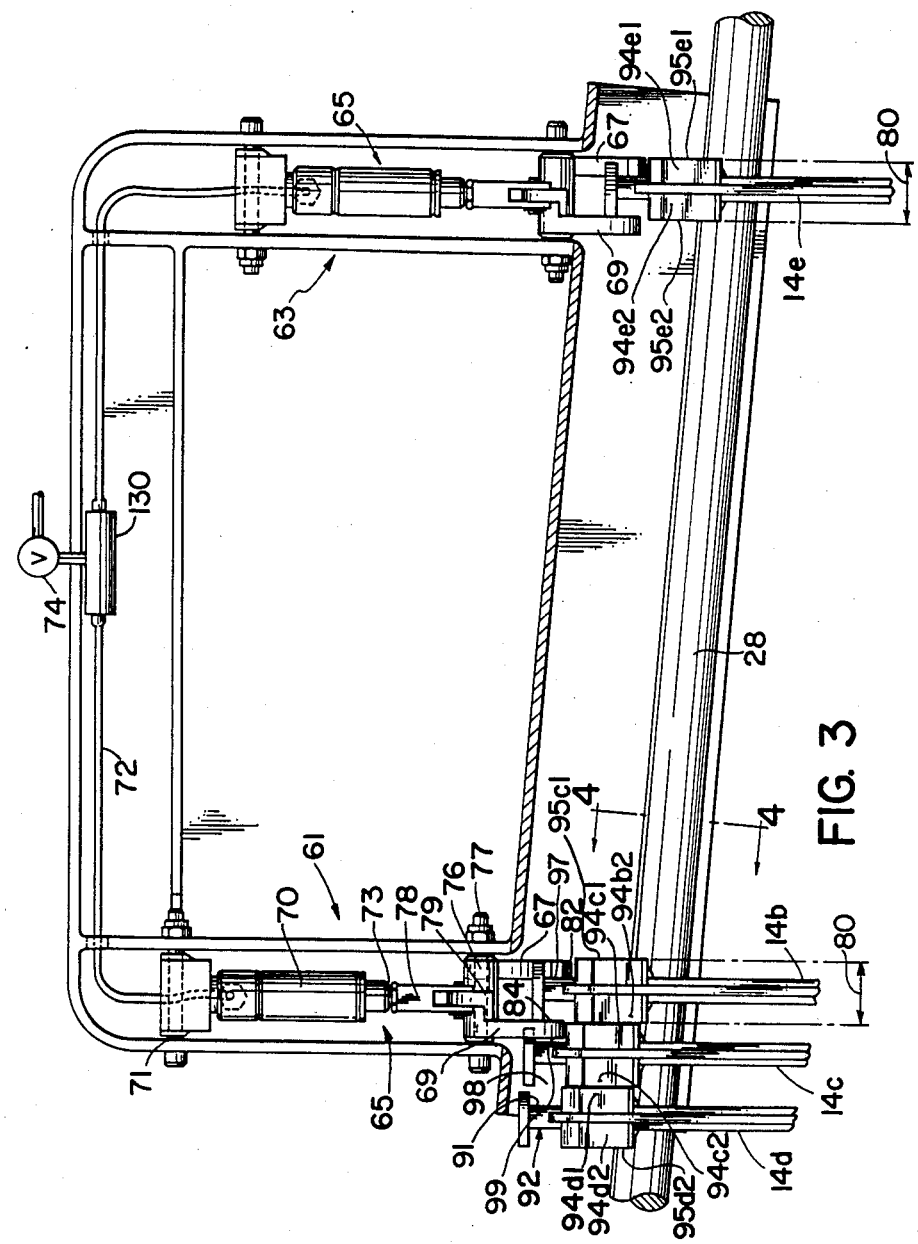
FIG. 3 is a side view of a stop within the conveyorized transport system, which stop includes two escapement mechanisms shown in their rest or deactivated positions. Each escapement mechanism embodies the invention.

FIG. 3 illustrates the escapement mechanism 61 of the stop 38 and the trolleys 14b to 14d backed up against it. As indicated with its trolley 14e, each trolley has a body portion located above the rail 28 with downstream shoulder 94e1 providing a downstream facing abutment surface 95e1 and an upstream shoulder providing an upstream facing abutment surface 95e2. Such abutment surfaces of adjacent trolleys engage one another as the trolleys move into abutting relationship so that the spacing between the two abutment surfaces of a trolley defines its effective length 80. The escapement mechanism comprises an actuator 65, a leading stop bracket 67 and a trailing stop bracket 69. The actuator 65 comprises a piston and cylinder assembly 70 pivotally-mounted on a shaft 71 and having a piston rod 73, an axle 77, a sleeve 76 rotatably mounted on the axle, a link 79 fixedly secured at one end perpendicular to the sleeve and a link 78 fixedly secured to the piston rod 73 and pivotally secured to the other end of the link 79. The leading stop bracket 67 has an angular, general L-shape and is fixedly secured at its top end (according to the orientation shown in FIG. 3) to one end of the sleeve 76 and also pivots about the axle 77, and the trailing stop bracket 69 also has an angular, general L-shape and is fixedly secured at its top end to the other end of the sleeve so that it also pivots about the axle 77. Because the stop brackets contact the trolleys and the stop brackets are mounted on the axle 77, the trolleys do not exert a radial force on the piston rod and therefore cannot jam the piston and cylinder assembly 70.

The stop faces 97 and 99 of the two brackets 67 and 69 are spaced apart from one another by a spacing less than the effective length 80 of each trolley. The brackets are angularly displaced about the axle 77 and the sleeve 76 relative to each other and mounted in opposite directions such that blades 88 and 132 (which carry the stop faces 97 and 99) of the stops 67 and 69, respectively (FIG. 4) aim in generally opposite directions and end tip faces 82 and 84 of the blades 88 and 132, respectively lie approximately in a common plane passing through the axis of the axle 77. However, if desired, the blades may overlap one another to some degree.

The piston and cylinder assembly 70 is internally spring-biased to retract the piston rod and is drivable by pressurized fluid to extend it. The pressurized fluid is supplied through a solenoid and valve assembly 74, a T-junction 130 and a hose 72, which assembly 74 is usually controlled by the momentary switch on the control box 50 at the work station 33 but occasionally controlled by the master computer 8.

Figure 4:
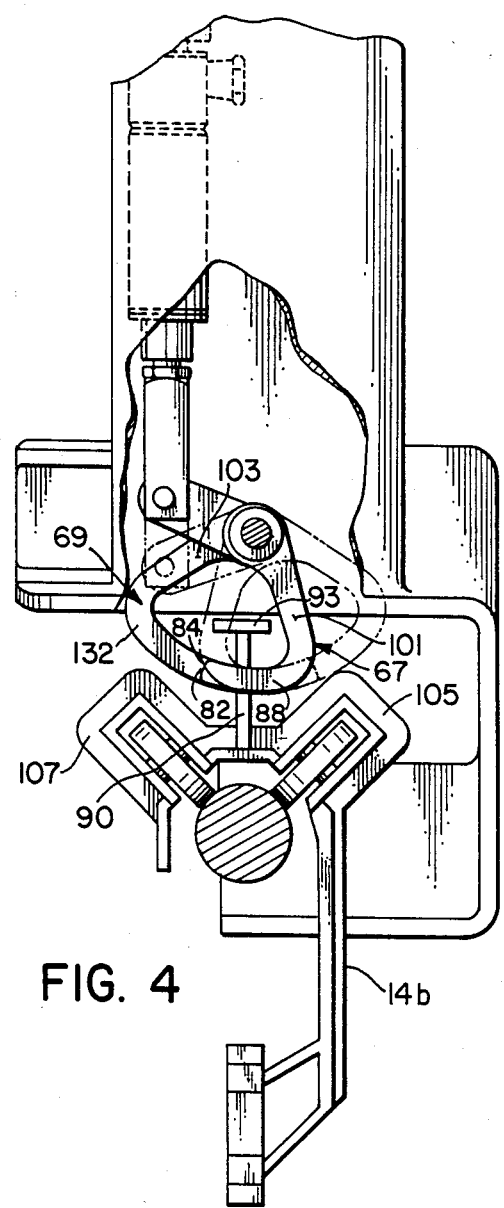
FIG. 4 is a cross sectional, end view of an upstream escapement mechanism of the stop of FIG. 3 taken along the plane 4—4.

In FIGS. 3 and 4, the piston and cylinder assembly 70 is shown in its retracted, resting position in which the blade portion 88 of the bracket 67 abuts a vertical stem portion 90 of a T-shaped crown portion 92 of the trolley 14b; a horizontal top portion 93 of the crown 92 passes above the blade 88 and through a plane defined by the face of the blade 88 which abuts the stem 90.

The shoulder 94c1 (FIG. 3) of the trolley 14c abuts the shoulder 94b2 of the trolley 14b and, likewise, the shoulder 94d1 of the trolley 14d abuts the shoulder 94c2 of the trolley 14c. The stem 90 of each trolley extends upwardly from the body portion and has a downstream facing stop face 91. The location of this stop face and the configuration of the trolleys is such that when a plurality of trolleys abut one another a space 98 is located ahead of each stop face. As shown in FIG. 3 the bracket 69, when its downstream trolley 14e is held by the bracket 67, is movable through this space with clearance relative to the stop face 91 on the stem of the trolley 14c. That is, the brackets 67 and 69 have upstream facing stop faces 97 and 99, respectively, for cooperation with its downstream facing stop face 91 of the trolleys, and these two stop faces 97 and 99 are spaced from one another by a distance less than the spacing between the two abutment surfaces 95,95 of each trolley.

Figure 5:
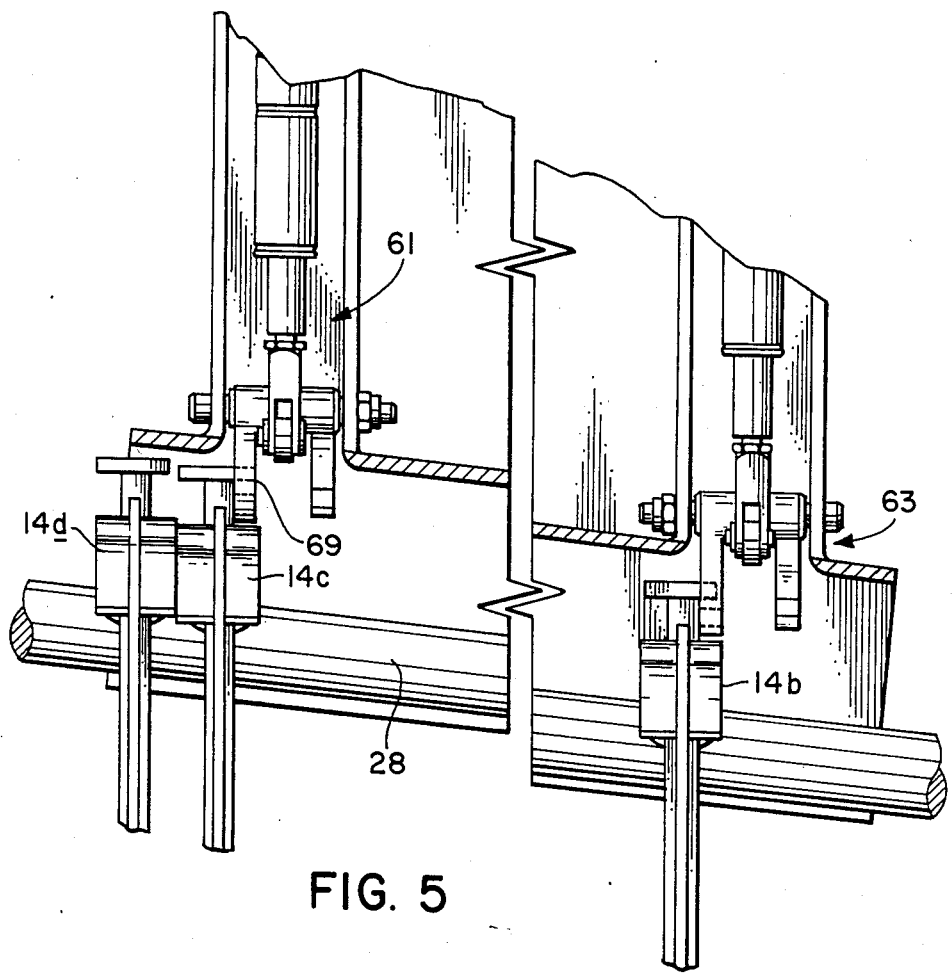
FIG. 5 is a side view of the stop of FIG. 3, both escapement mechanisms are shown in their activated state.

When the momentary switch on the control box 50 is depressed, the escapement mechanism 61 is activated, and the piston rod 73 extends downwardly causing the links 78 and 79 to move downwardly and the sleeve 76 to pivot counterclockwise approximately 30 degrees. Since the brackets 67 and 69 are fixedly secured to the sleeve 76, the brackets pivot in unison with each other, the bracket 67 pivots upwardly with the blade portion 88 moving out of the path of the trolley 14b and simultaneously, the bracket 69 pivots downwardly with its blade portion 132 moving into the path of the stem 90 of the trolley crown 92 of the trolley 14c. The clearance 98 allows the bracket 69 to freely swing in front of the stem 90 of the trolley 14c. Hence, the leading trolley 14b is released by the escapement mechanism 61 and rolls downwardly along the sloping rail 28 (to the right in FIG. 3) towards the escapement mechanism 63. Also, the trolleys 14c and 14d roll slightly forward until the trolley 14c contacts the trailing stop bracket 69 as shown in FIG. 5.

After the trolley 14b rolls past the bracket 67, the momentary switch is released, deactivating the piston and cylinder assembly 70 and causing the piston rod 73 to retract, and the brackets 67 and 69 to simultaneously pivot back to the rest position illustrated in FIGS. 3 and 4. When they pivot back, the bracket 69 releases the trolleys 14c and 14d, and they roll forward until the crown portion of the trolley 14c abuts the bracket 67. The trolley 14d follows behind the trolley 14c and comes to rest against the shoulder 94c2 of the trolley 14c shown. As discussed above, a minimum time is required between the activation and deactivation of the piston and cylinder assembly 65 to allow the trolley 14b to clear the bracket 67; however, no amount of additional time delay between the activation and de-activation will cause the trolley 14c to advance beyond the bracket 67 without the escapement mechanism first returning to its rest position so that no timing circuits or delay mechanisms are required. Hence, the piston and cylinder assembly 70 may be de-activated at any time while the trolley is traveling between the bracket 67 and the escapement mechanism 63 or after the trolley reaches the escapement mechanism 63 as shown in FIG. 5. In addition, the relative angular orientation of the stop brackets and the blade portions, by which orientation there is little or no space between the end tip faces 82 and 84, prevents the trolley second in line from advancing into the path of the trailing stop bracket and thereby jamming the escapement mechanism when the escapement mechanism is activated.

The escapement mechanism 63 is identical to the escapement mechanism 61 and operates in synchronism with it because the escapement mechanism 63 utilizes the same source of pressurized fluid and receives it through the same solenoid and valve assembly 74 and the T-connector 130. Hence, when the escapement mechanism 61 is activated to release the trolley 14b, the escapement mechanism 63 is activated to simultaneously release the trolley 14e so that a short time later the trolley 14b rests alone against the escapement mechanism 63. Also, because the escapement mechanisms 61 and 63 operate in synchronism with one another, it is virtually impossible for the trolley 14b to bypass the escapement mechanism 63, and after the escapement mechanisms 61 and 63 are de-activated, the trolley 14b comes to rest against the leading bracket 67 of the escapement mechanism 65. Hence, no timing circuits or mechanisms are required.

Even though the escapement mechanism 63 is illustrated as being coupled to the escapement mechanism 65 through the common valve 74 and the "T" 130, it should be clearly understood that, if desired, the escapement mechanism 63 and the "T" 130 may be deleted and the valve 74 connected directly to the hose 72 to provide a single, independently operated escapement mechanism 61 having a wide range of applications within and without the garment-making industry.

The escapement mechanism 57 at the base of the elevator is identical to the escapement mechanism 61 and to the escapement mechanism 63 and need not be discussed further except to say that it is operated by its own solenoid and valve assembly which is typically controlled by the computer 8.

Figure 6:
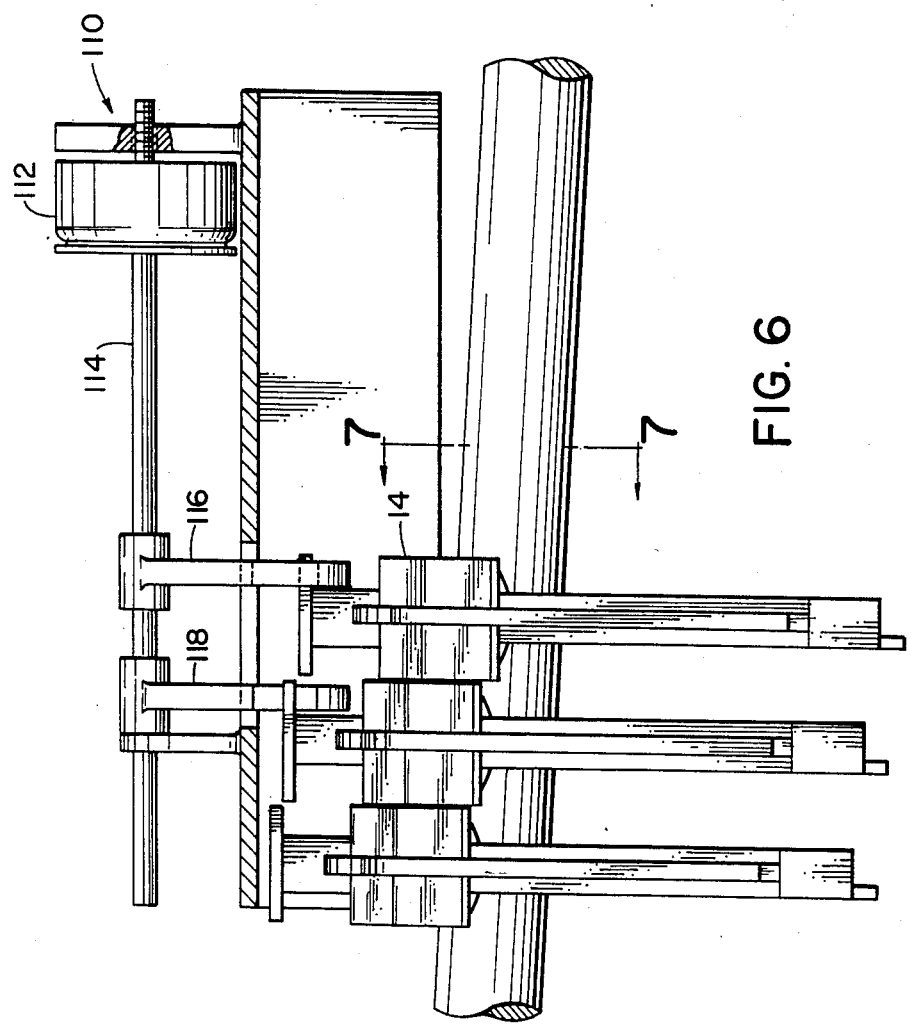
FIG. 6 is a side view of another escapement mechanism embodying the invention.
Figure 7:
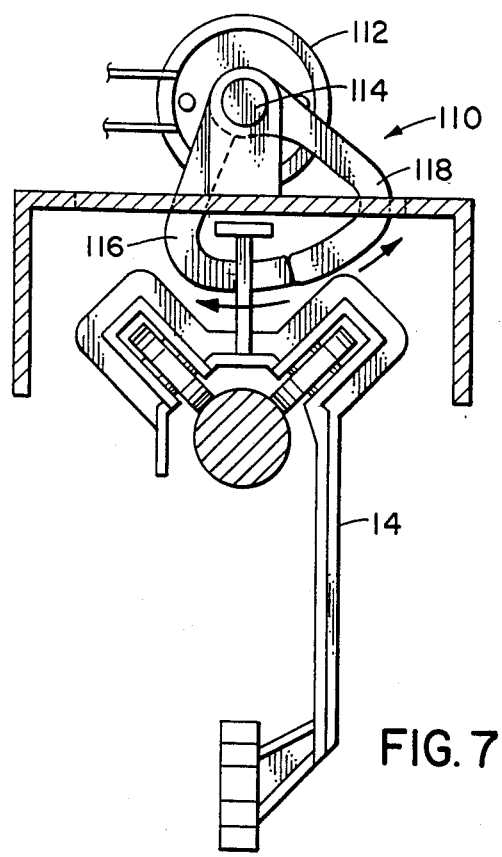
FIG. 7 is a cross-sectional, end view of the escapement mechanism of FIG. 6 taken along the plane 7—7.

FIGS. 6 and 7 show another escapement mechanism generally designated 110 embodying the present invention, which mechanism includes a rotary drive solenoid 112, a shaft 114 driven by the solenoid, a leading stop bracket 116 fixedly mounted on the shaft 114 and a trailing stop bracket 118 fixedly mounted on the shaft 114 somewhat upstream of the leading bracket. The rotary drive solenoid is capable of rotating approximately 35 degrees clockwise from a rest position and then rotating back to the rest position, and by way of example, comprises part no. 129736-032 made by Ledex of Vandalia, Ohio.

The brackets 116 and 118 are identical in shape to the brackets 67 and 69 and are equivalently oriented on the shaft 114 relative to each other and to the trolleys as are the brackets 67 and 69 on the shaft 75 to each other and to the trolleys. Also, the rotary drive solenoid 112 imparts pivotal motion to the shaft 114 as do the piston and cylinder assembly 70 and the links 78 and 77 impart pivotal motion to the sleeve 76. As a result, the escapement mechanism 110 is functionally equivalent to the escapement mechanism 61. If desired, the escapement mechanism 110 may be coupled with a similar escapement mechanism located further downstream to form to stop analogous in function to the stop 38 or may be coupled with a gate comprising a single L-shaped bracket mounted to the shaft 114. In which case, the single bracket is identical in orientation with respect to the shaft as is the bracket 116 and when a trolley is released from the escapement mechanism 110 the downstream gate should be returned to its resting position before the trolley reaches it, otherwise the released trolley will bypass the downstream gate.

By the foregoing, escapement mechanisms embodying the present invention have been disclosed. However, numerous modifications and substitutions may be made without deviating from the scope of the invention.

For example, the spacing between the leading and trailing brackets of the escapement mechanism 61 may be increased if desired to allow more than one trolley to fit between the two brackets at one time and therefore allow more than one trolley to advance during a cycle of operation, such cycle comprising the activation and subsequent deactivation of the escapement mechanism. Also, the shape of the brackets, or that of the trolley crowns, may be varied if desired provided that they engage one another at the times indicated above. For example, because each of the trolley crowns 92 have a wide top portion 93, it is possible to utilize leading and trailing stop brackets which comprise a straight bracket or rod extending from the sleeve 76 provided that when a given bracket is called upon to block the path of the trolleys, the rod is sufficiently close to vertical orientation that it is in the path of the top portion 94 of the respective trolley crown.

It is also possible to construct an escapement mechanism embodying the present invention which is identical to the escapement mechanism 61 except that a timing belt, timing pulleys, and stepping motor substitute for the piston and cylinder assembly 70 to drive the stop brackets 67 and 69. The stepping motor may either operate in an oscillatory, forward and reverse mode causing the brackets 67 and 69 to pivot about the axle 77 operate solely in one direction causing the trolleys to revolve about the axle 77, provided the top portions 94 of the trolley crowns are removed to allow the stop brackets to clear the trolleys.

Therefore, the invention has been disclosed by way of illustration and not limitation.

We claim:

1. In a conveyorized transport system, the combination comprising:
    a rail system including an elongated inclined rail portion,
    a plurality of trolleys riding on said rail system and movable freely by gravity in a downstream direction along said inclined rail portion, each of said trolleys having a first downstream facing abutment surface and a second upstream facing abutment surface which surfaces are so arranged that the second abutment surface of a leading trolley engages the first abutment surface of the next trailing trolley as such two trolleys move together into abutting relationship, the spacing between said first and second abutment surfaces of a trolley being the effective length of said trolley and being substantially uniform for all of said trolleys, each of said trolleys further having a downstream facing stop surface and being so configured that when a plurality of said trolleys are in abutting relationship to one another a space appears ahead of said stop surface of each of said abutting trolleys, and
    an escapement mechanism located adjacent said rail portion at one point along its length for controlling the movement of trolleys along said inclined rail portion, said escapement mechanism having two stop members each having an upstream facing stop surface, said two upstream facing stop surfaces of said two stop members being spaced from one another by a distance less than said effective length of each trolley, means supporting said two stop members for movement in unison relative to said rail portion between a rest position and a second position, said two stop members being so arranged that in said rest position the stop face of the downstream one of said stop members engages the stop face on the leading one of the trolleys then located at and upstream of said escapement mechanism and the stop face of the upstream one of said stop members is out of the path of movement of the stop faces of said trolleys, and so that in said second position the stop face of the downstream one of said stop members is out of the path of said stop faces of said trolleys and said stop face of the upstream one of said stop members is positioned in the path of said stop faces of said trolleys, said two stop members being further so arranged that during movement between said rest position and said second position as the stop face of one member moves out of the path of said trolley stop faces the stop face of the other of said members moves into the path of said trolley stop faces so that one of said stop faces of said members is always in the path of said stop faces of said trolleys regardless of the position of said two members relative to said inclined rail portion, said upstream stop member having a thickness parallel to said inclined rail portion less than the length of said space which appears ahead of each stop surface of a plurality of abutting trolleys and said upstream stop member being so arranged that when moving from said first position to said second position it moves through the space appearing ahead of the stop surface of the trolley immediately behind the leading trolley, and means for moving said two stop members in unison between said rest position and said second position, each of said trolleys having a body portion located above said inclined rail portion and providing said first and second abutment surfaces, and each of said trolleys having a stem extending upwardly from said body portion midway between said two abutment surfaces, said stem having a thickness parallel to said rail portion less than the spacing between said two abutment surfaces, said downstream facing stop surface of each trolley being provided by the downstream facing side of its stem.

2. The combination defined in claim 1 further characterized by said body portion and said stem of each trolley being generally symmetrical with respect to a plane passing through their middles perpendicular to said inclined rail portion.

3. The combination defined in claim 2 further characterized by a crown located at the upper end of the stem of each trolley and having a dimension parallel to said rail portion substantially larger than said thickness of said stem and no more than said spacing between said two abutment surfaces of the associated trolley.

4. In a conveyorized transport system, the combination comprising:

a rail system including an elongated inclined rail portion, a plurality of trolleys riding on said rail system and moveable freely by gravity in a downstream direction along said inclined rail portion, each of said trolleys having a first downstream facing abutment surface and a second upstream facing abutment surface which surfaces are so arranged that the second abutment surface of a leading trolley engages the first abutment surface of the next trailing trolley as such two trolleys move together into abutting relationship, the spacing between said first and second abutment surfaces of a trolley being the effective length of said trolley and being substantially uniform for all of said trolleys, each of said trolleys further having a downstream facing stop surface and being so configured that when a plurality of said trolleys are in abutting relationship to one another a space appears ahead of said stop surface of each of said abutting trolleys, each of said trolleys having a body portion located above said inclined rail portion and providing said first and second abutment surfaces, and each of said trolleys having a stem extending upwardly from said body portion midway between said two abutment surfaces said stem having a thickness parallel to said rail portion less than the spacing between said two abutment surfaces, said downstream facing stop surface of each trolley being provided by the downstream facing side of its stem, and an apparatus for controlling the movement of trolleys along said inclined rail portion in such a manner that when a number of trolleys appear on said inclined rail portion at and upstream of a work station located along said rail portion said apparatus presents and holds only one trolley at a time at said work station and holds all other of said trolleys a substantial distance upstream of said work station so as to position only one trolley at a time at said work station and to individually separate and space it from said other trolleys, said apparatus including a first escapement mechanism located adjacent said rail portion at said work station and a second escapement mechanism located adjacent said rail portion upstream of said first escapement mechanism by a spacing equal to many times the effective length of each trolley, said second escapement mechanism having two stop members each having an upstream facing stop surface, said two upstream facing stop surfaces of said two stop members being spaced from one another by a distance less than said effective length of each trolley, means supporting said two stop members for movement in unison relative to said rail portion between a rest position and a second position, said two stop members being so arranged that in said rest position the stop face of the downstream one of said stop members engages the stop face on the leading one of the trolleys then located at and upstream of said second escapement mechanism and the stop face of the upstream one of said stop members is out of the path of movement of the stop faces of said trolleys and so that in said second position the stop face of the downstream one of said stop members is out of the path of said stop faces of said trolleys and said stop face on the upstream one of said stop members is positioned in the path of said stop faces of said trolleys, said two stop members being further so arranged that during movement between said rest position and said second position as the stop face of one member moves out of the path of said trolley stop faces the stop face of the other of said members moves into the path of said trolley stop faces so that one of said stop faces of said members is always in the path of said stop faces of said trolleys regardless of the position of said two members relative to said inclined rail portion, said upstream stop member having a thickness parallel to said inclined rail portion less than the length of said space which appears ahead of each stop surface of a plurality of abutting trolleys and said upstream stop member being so arranged that when moving from said rest position to said second position it moves through the space appearing ahead of the stop surface of the trolley immediately behind the leading trolley, said first escapement mechanism having at least one stop member having an upstream facing stop surface, means supporting said at least one stop member of said first escapement mechanism for movement relative to said rail portion between a rest position and a second position, said at least one stop member being so arranged that in said rest position it is positioned in the path of said stop faces of said trolleys and so that in said second position the stop face of said at least one stop member is out of the path of said stop faces of said trolleys, and means for moving said two stop members of said second escapement mechanism and said at least one stop member of said first escapement mechanism in unison between said rest and second positions.

* * * * *